US011908374B2

(12) United States Patent
Yu

(10) Patent No.: US 11,908,374 B2
(45) Date of Patent: Feb. 20, 2024

(54) DEMULTIPLEXER, AND DISPLAY PANEL AND DISPLAY DEVICE HAVING DEMULTIPLEXER

(71) Applicant: WUHAN CHINA STAR OPTOELECTRONICS TECHNOLOGY CO., LTD., Hubei (CN)

(72) Inventor: Wenqiang Yu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/047,530

(22) PCT Filed: Aug. 28, 2020

(86) PCT No.: PCT/CN2020/112036
§ 371 (c)(1),
(2) Date: Oct. 14, 2020

(87) PCT Pub. No.: WO2022/036744
PCT Pub. Date: Feb. 24, 2022

(65) Prior Publication Data

US 2023/0169905 A1 Jun. 1, 2023

(30) Foreign Application Priority Data

Aug. 20, 2020 (CN) ......................... 202010844349.9

(51) Int. Cl.
*G09G 3/20* (2006.01)

(52) U.S. Cl.
CPC ... *G09G 3/2092* (2013.01); *G09G 2310/0297* (2013.01)

(58) Field of Classification Search
CPC ......... G09G 3/2092; G09G 2310/0297; G09G 3/20; G09G 2300/0417; G09G 2300/0426
See application file for complete search history.

(56) References Cited

U.S. PATENT DOCUMENTS 11,195,484 B2 * 12/2021 Li ......................... G09G 3/3648
2016/0093260 A1 * 3/2016 Watsuda .............. G09G 3/3611 345/87
2016/0125783 A1 * 5/2016 Huang ................. G09G 3/2003 345/694

(Continued)

FOREIGN PATENT DOCUMENTS

CN 110136633 A 8/2019
CN 110189725 A 8/2019

(Continued)

*Primary Examiner* — Jose R Soto Lopez
(74) *Attorney, Agent, or Firm* — PV IP PC; Wei Te Chung; Zhigang Ma

(57) ABSTRACT

A demultiplexer is provided. The demultiplexer includes a plurality of demultiplexer units. Each of the demultiplexer units includes two first type thin film transistors sharing a source electrode, and two second type thin film transistors are disposed between two of the demultiplexer units adjacent to each other. Space utilization of the demultiplexer is improved. A display panel and a display device having the demultiplexer are also provided.

12 Claims, 3 Drawing Sheets

(56) References Cited

U.S. PATENT DOCUMENTS

| | | | | |
|---|---|---|---|---|
| 2017/0337860 | A1* | 11/2017 | Yi | G09G 3/3648 |
| 2018/0108285 | A1* | 4/2018 | Zhao | G02F 1/1368 |
| 2020/0335059 | A1* | 10/2020 | Zheng | G09G 3/2074 |
| 2021/0209979 | A1* | 7/2021 | Gao | G09G 3/006 |
| 2022/0013543 | A1* | 1/2022 | Hosoyachi | G09G 3/006 |

FOREIGN PATENT DOCUMENTS

| | | | |
|---|---|---|---|
| CN | 110197636 | A | 9/2019 |
| CN | 110335561 | A | 10/2019 |
| KR | 20200021295 | A | 2/2020 |

* cited by examiner

DEMULTIPLEXER, AND DISPLAY PANEL AND DISPLAY DEVICE HAVING DEMULTIPLEXER

FIELD OF INVENTION

The present disclosure relates to the field of display technologies, and more particularly, to a demultiplexer, and a display panel and a display device having the demultiplexer.

BACKGROUND OF INVENTION

Regarding development of small and medium-sized display panel market, it is an inevitable trend for display panels to achieve high resolution and narrow bezels. Among various small and medium-sized display panels, low temperature polysilicon (LTPS) display panels are gradually becoming mainstream products in the small and medium-sized display panel market due to their high resolution advantage.

In the LTPS display panels, demultiplexers (Demuxs) are usually configured to divide one data output from a drive chip into multiple data, and the demultiplexers are mainly composed of thin film transistors (TFTs). FIG. 1 is a schematic layout diagram of thin film transistors in a current demultiplexer. As shown in FIG. 1, the demultiplexer includes two demultiplexer units, each big dashed box in FIG. 1 represents one demultiplexer unit, each demultiplexer unit includes two thin film transistors sharing a source electrode, and each small dashed box in FIG. 1 represents one thin film transistor. In FIGS. 1, g1, g2, g3, and g4 represent four gate electrodes, s1 and s2 represent two source electrodes, and d1, d2, d3, and d4 represent four drain electrodes.

However, in a structure of the Demux shown in FIG. 1, a layout of the TFTs causes low space utilization of the Demux and an overly large size of the Demux, which is not beneficial to realize narrow bezels of the LTPS display panels.

Technical problem: the present disclosure provides a demultiplexer, and a display panel and a display device having the demultiplexer to solve a technical problem of low space utilization in current demultiplexers.

SUMMARY OF INVENTION

In a first aspect, the present disclosure provides a demultiplexer. The demultiplexer includes a plurality of demultiplexer units, each of the demultiplexer units includes two first type thin film transistors sharing a source electrode, and two second type thin film transistors are disposed between two of the demultiplexer units adjacent to each other.

In some embodiments, the two of the demultiplexer units adjacent to each other are respectively a first demultiplexer unit and a second demultiplexer unit, two first type thin film transistors in the first demultiplexer unit are respectively a first thin film transistor and a second thin film transistor, two first type thin film transistors in the second demultiplexer unit are respectively a third thin film transistor and a fourth thin film transistor, and two second type thin film transistors between the first demultiplexer unit and the second demultiplexer unit are respectively a fifth thin film transistor and a sixth thin film transistor; and the fifth thin film transistor and the second thin film transistor share a drain electrode, and the sixth thin film transistor and the third thin film transistor share another drain electrode.

In some embodiments, a gate electrode of the fifth thin film transistor is connected to a gate electrode of the second thin film transistor, and a gate electrode of the sixth thin film transistor is connected to a gate electrode of the third thin film transistor.

In some embodiments, the gate electrode of the fifth thin film transistor includes a first subsection and a second subsection vertically connected to each other, and the first subsection is vertically connected to a middle part of the gate electrode of the second thin film transistor; and the gate electrode of the sixth thin film transistor includes a third subsection and a fourth subsection vertically connected to each other, and the third subsection is vertically connected to a middle part of the gate electrode of the third thin film transistor.

In some embodiments, the gate electrode of the second thin film transistor, the first subsection, and the second subsection are combined to form a first shape, and the first shape is h-shaped; and the gate electrode of the third thin film transistor, the third subsection, and the fourth subsection are combined to form a second shape, and the second shape is a shape formed by flipping the first shape horizontally and vertically.

In some embodiments, a source electrode shared by the first thin film transistor and the second thin film transistor is a first source electrode, and another source electrode shared by the third thin film transistor and the fourth thin film transistor is a second source electrode; and a source electrode of the fifth thin film transistor is connected to the first source electrode, and a source electrode of the sixth thin film transistor is connected to the second source electrode.

In some embodiments, the source electrode of the fifth thin film transistor includes a fifth subsection and a sixth subsection vertically connected to each other, and the fifth subsection is vertically connected to a bottom of the first source electrode; the source electrode of the sixth thin film transistor includes a seventh subsection and an eighth subsection vertically connected to each other, and the seventh subsection is vertically connected to a top of the second source electrode; and wherein the seventh subsection is an adapter line.

In some embodiments, a gate electrode of the first thin film transistor, the gate electrode of the second thin film transistor, the gate electrode of the third thin film transistor, a gate electrode of the fourth thin film transistor, the gate electrode of the fifth thin film transistor, and the gate electrode of the sixth thin film transistor are disposed in a first layer; the first source electrode, the second source electrode, the source electrode of the fifth thin film transistor, and the source electrode of the sixth thin film transistor are disposed in a second layer; and a drain electrode of the first thin film transistor, a drain electrode of the second thin film transistor, a drain electrode of the third thin film transistor, and a drain electrode of the fourth thin film transistor are disposed in the second layer.

In some embodiments, the gate electrode of the first thin film transistor and the gate electrode of the third thin film transistor are connected to a first clock signal line, the gate electrode of the second thin film transistor and the gate electrode of the fourth thin film transistor are connected to a second clock signal line, the first source electrode is connected to a first data line, and the second source electrode is connected to a second data line.

In a second aspect, the present disclosure provides a display panel. The display panel includes a demultiplexer including a plurality of demultiplexer units. Wherein, each of the demultiplexer units includes two first type thin film transistors sharing a source electrode, and two second type thin film transistors are disposed between two of the demultiplexer units adjacent to each other.

In some embodiments, the two of the demultiplexer units adjacent to each other are respectively a first demultiplexer unit and a second demultiplexer unit, two first type thin film transistors in the first demultiplexer unit are respectively a first thin film transistor and a second thin film transistor, two first type thin film transistors in the second demultiplexer unit are respectively a third thin film transistor and a fourth thin film transistor, and two second type thin film transistors between the first demultiplexer unit and the second demultiplexer unit are respectively a fifth thin film transistor and a sixth thin film transistor; and the fifth thin film transistor and the second thin film transistor share a drain electrode, and the sixth thin film transistor and the third thin film transistor share another drain electrode.

In some embodiments, a gate electrode of the fifth thin film transistor is connected to a gate electrode of the second thin film transistor, and a gate electrode of the sixth thin film transistor is connected to a gate electrode of the third thin film transistor.

In some embodiments, the gate electrode of the fifth thin film transistor includes a first subsection and a second subsection vertically connected to each other, and the first subsection is vertically connected to a middle part of the gate electrode of the second thin film transistor; and the gate electrode of the sixth thin film transistor includes a third subsection and a fourth subsection vertically connected to each other, and the third subsection is vertically connected to a middle part of the gate electrode of the third thin film transistor.

In some embodiments, the gate electrode of the second thin film transistor, the first subsection, and the second subsection are combined to form a first shape, and the first shape is h-shaped; and the gate electrode of the third thin film transistor, the third subsection, and the fourth subsection are combined to form a second shape, and the second shape is a shape formed by flipping the first shape horizontally and vertically.

In some embodiments, a source electrode shared by the first thin film transistor and the second thin film transistor is a first source electrode, and a source electrode shared by the third thin film transistor and the fourth thin film transistor is a second source electrode; and a source electrode of the fifth thin film transistor is connected to the first source electrode, and a source electrode of the sixth thin film transistor is connected to the second source electrode.

In some embodiments, the source electrode of the fifth thin film transistor includes a fifth subsection and a sixth subsection vertically connected to each other, and the fifth subsection is vertically connected to a bottom of the first source electrode; the source electrode of the sixth thin film transistor includes a seventh subsection and an eighth subsection vertically connected to each other, and the seventh subsection is vertically connected to a top of the second source electrode; and wherein the seventh subsection is an adapter line.

In some embodiments, a gate electrode of the first thin film transistor, the gate electrode of the second thin film transistor, the gate electrode of the third thin film transistor, a gate electrode of the fourth thin film transistor, the gate electrode of the fifth thin film transistor, and the gate electrode of the sixth thin film transistor are disposed in a first layer; the first source electrode, the second source electrode, the source electrode of the fifth thin film transistor, and the source electrode of the sixth thin film transistor are disposed in a second layer; and a drain electrode of the first thin film transistor, a drain electrode of the second thin film transistor, a drain electrode of the third thin film transistor, and a drain electrode of the fourth thin film transistor are disposed in the second layer.

In some embodiments, the gate electrode of the first thin film transistor and the gate electrode of the third thin film transistor are connected to a first clock signal line, the gate electrode of the second thin film transistor and the gate electrode of the fourth thin film transistor are connected to a second clock signal line, the first source electrode is connected to a first data line, and the second source electrode is connected to a second data line.

In some embodiments, the display panel is a low temperature polysilicon display panel.

In a third aspect, the present disclosure provides a display device including the above display panel.

Beneficial effect: the demultiplexer and the display panel and the display device having the demultiplexer provided in the present disclosure dispose two thin film transistors between two of the demultiplexer units adjacent to each other, thereby improving space utilization of the demultiplexer and reducing a size of the demultiplexer. If the demultiplexer is applied to LTPS display panels, it is beneficial to realize narrow bezels of the LTPS display panels and LTPS display devices.

DETAILED DESCRIPTION OF PREFERRED EMBODIMENTS

In order to make the purpose, technical solutions, and effects of the present disclosure more clear and definite, the following further describes the present disclosure in detail with reference to the drawings and embodiments. It should be understood that the specific embodiments described herein are only used to explain the disclosure, and are not used to limit the disclosure.

Figure 1:
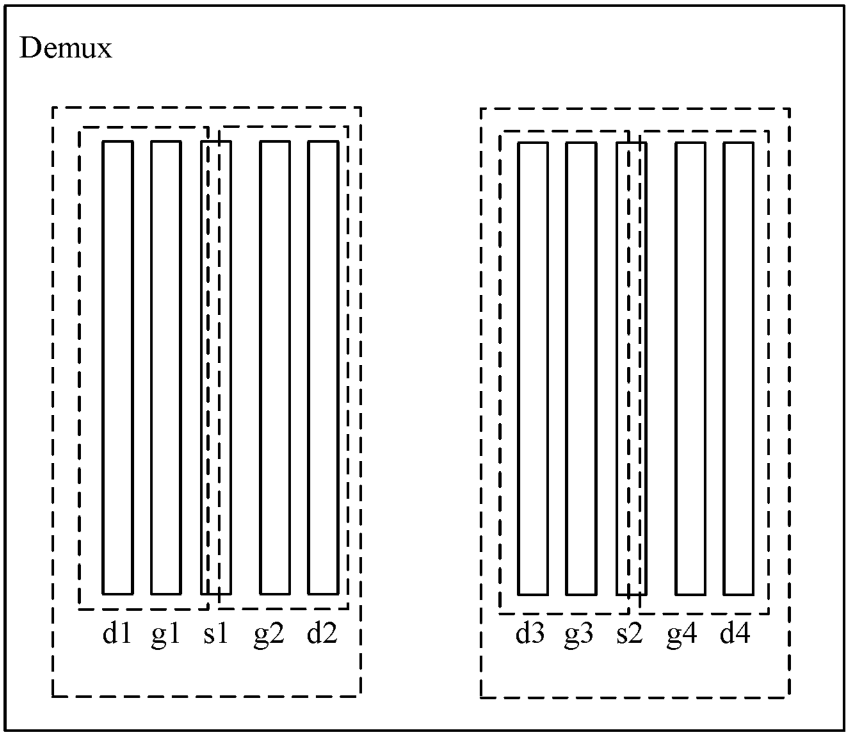
FIG. 1 is a schematic layout diagram of thin film transistors in current demultiplexer.
Figure 2:
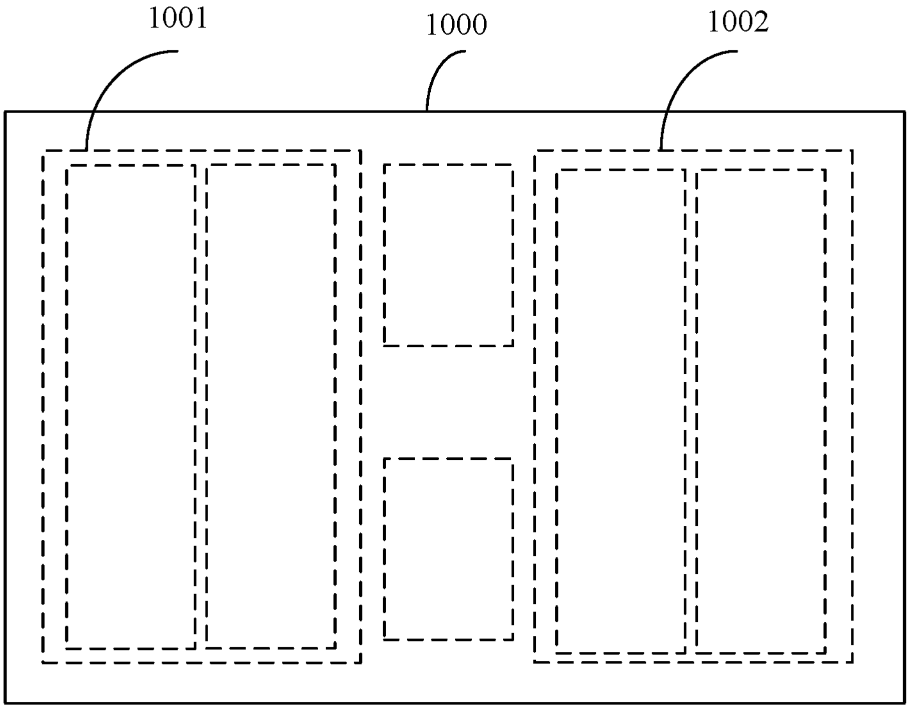
FIG. 2 is a schematic structural diagram of a demultiplexer according to an embodiment of the present disclosure.

An embodiment of the present disclosure provides a demultiplexer. Referring to FIG. 2, the demultiplexer 1000 includes a plurality of demultiplexer units, and the demultiplexer units shown in FIG. 2 are two, which are respectively a first demultiplexer unit 1001 and a second demultiplexer unit 1002 from left to right. Wherein, each of the demultiplexer units includes two thin film transistors sharing a source electrode. For ease of description, the thin film transistors inside the demultiplexer units are called first type thin film transistors herein. Each dashed box inside each of the demultiplexer units represents one first type thin film transistor.

Two thin film transistors are further disposed between two of the demultiplexer units adjacent to each other. For ease of description, the thin film transistors between the two of the demultiplexer units adjacent to each other are called second type thin film transistors herein. Each dashed box between the first demultiplexer unit 1001 and the second demultiplexer unit 1002 in FIG. 2 represents one second type thin film transistor.

It can be understood that the embodiment of the present disclosure disposes two second type thin film transistors between the two of the demultiplexer units adjacent to each other, thereby improving space utilization of the demultiplexer 1000 and reducing a size of the demultiplexer 1000. If the demultiplexer 1000 is applied to LTPS display panels, it is beneficial to realize narrow bezels of the LTPS display panels. In addition, if the size of the demultiplexer 1000 provided in the embodiment of the present disclosure is allowed to be same as that of current demultiplexer, the demultiplexer 1000 provided in the embodiment of the present disclosure can accommodate more thin film transistors, and if this demultiplexer 1000 is applied to the LTPS display panels, charging efficiency can be greatly improved.

Figure 3:
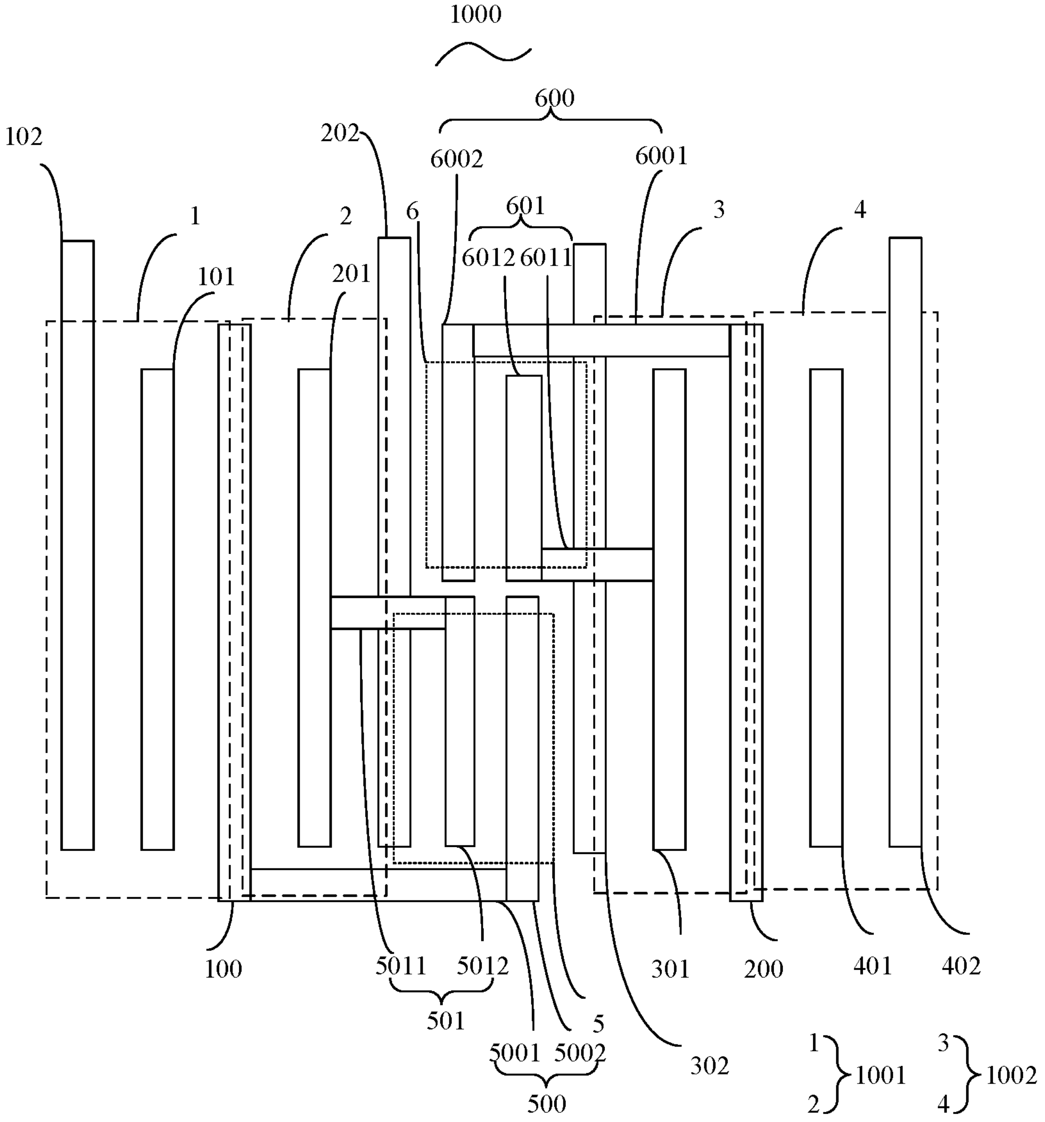
FIG. 3 is a schematic layout diagram of thin film transistors in the demultiplexer according to an embodiment of the present disclosure.

Referring to FIG. 3, for the first demultiplexer unit 1001, two first type thin film transistors in the first demultiplexer unit 1001 are respectively called a first thin film transistor 1 and a second thin film transistor 2 in an order from left to right. For the second demultiplexer units 1002, two first type thin film transistors in the second demultiplexer unit 1002 are respectively called a third thin film transistor 3 and a fourth thin film transistor 4 in the order from left to right.

Wherein, a gate electrode of the first thin film transistor 1 is called a first gate electrode 101, a gate electrode of the second thin film transistor 2 is called a second gate electrode 201, a gate electrode of the third thin film transistor 3 is called a third gate electrode 301, and a gate electrode of the fourth thin film transistor 4 is called a fourth gate electrode 401. The first gate electrode 101, the second gate electrode 201, the third gate electrode 301, and the fourth gate electrode 401 are all in a same layer, for ease of description, this layer is called a first layer, and the first gate electrode 101, the second gate electrode 201, the third gate electrode 301, and the fourth gate electrode 401 are long-strip shaped, and are spaced apart and in parallel to each other.

Since the first thin film transistor 1 and the second thin film transistor 2 share a source electrode, and the third thin film transistor 3 and the fourth thin film transistor 4 share another source electrode, for ease of description, the source electrode shared by the first thin film transistor 1 and the second thin film transistor 2 is called a first source electrode 100, and the source electrode shared by the third thin film transistor 3 and the fourth thin film transistor 4 is called a second source electrode 200. The first source electrode 100 and the second source electrode 200 are all in a same layer, and for ease of description, this layer is called a second layer. It should be noted that the second layer and the first layer are not in a same layer. In addition, the first source electrode 100 and the second source electrode 200 are long-strip shaped, and are spaced apart and in parallel to each other.

A drain electrode of the first thin film transistor 1 is called a first drain electrode 102, a drain electrode of the second thin film transistor 2 is called a second drain electrode 202, a drain electrode of the third thin film transistor 3 is called a third drain electrode 302, and a drain electrode of the fourth thin film transistor 4 is called a fourth drain electrode 402. The first drain electrode 102, the second drain electrode 202, the third drain electrode 302, and the fourth drain electrode 402 are all in the second layer. In addition, the first drain electrode 102, the second drain electrode 202, the third drain electrode 302, and the fourth drain electrode 402 are long-strip shaped, and are spaced apart and in parallel to each other.

Two second type thin film transistors between the first demultiplexer unit 1001 and the second demultiplexer unit 1002 are respectively called a fifth thin film transistor 5 and a sixth thin film transistor 6. Wherein, the fifth thin film transistor 5 and the second thin film transistor 2 share a drain electrode, that is, the two share the second drain electrode 202, and the sixth thin film transistor 6 and the third thin film transistor 3 share another drain electrode, that is, the two share the third drain electrode 302.

It can be understood that since the fifth thin film transistor 5 and the second thin film transistor 2 share the drain electrode, and the sixth thin film transistor 6 and the third thin film transistor 3 share the another drain electrode, it is not necessary to manufacture drain electrodes for the fifth thin film transistor 5 and the sixth thin film transistor 6 separately, thereby reducing complexity of production processes and a space occupied by the fifth thin film transistor 5 and the sixth thin film transistor 6. Therefore, the space utilization of the demultiplexer 1000 can be improved.

In some embodiments, as shown in FIG. 3, a gate electrode of the fifth thin film transistor 5 is called a fifth gate electrode 501, the fifth gate electrode 501 is connected to the gate electrode of the second thin film transistor 2 (that is, the second gate electrode 201), and a gate electrode of the sixth thin film transistor 6 is called a sixth gate electrode 601, the sixth gate electrode 601 is connected to the gate electrode of the third thin film transistor 3 (that is, the third gate electrode 301).

Wherein, the fifth gate electrode 501 and the second gate electrode 201 are in the same layer (that is, the first layer). The fifth gate electrode 501 includes a first subsection 5011 and a second subsection 5012 vertically connected to each other, and the first subsection 5011 is vertically connected to a middle part of the second gate electrode 201.

The sixth gate electrode 601 and the third gate electrode 301 are in the same layer (that is, the first layer). The sixth gate electrode 601 includes a third subsection 6011 and a fourth subsection 6012 vertically connected to each other, and the third subsection 6011 is vertically connected to a middle part of the third gate electrode 301.

In some embodiments, as shown in FIG. 3, the gate electrode of the second thin film transistor 2 (that is, the second gate electrode 201), the first subsection 5011, and the second subsection 5012 are combined to form a first shape, and the first shape is h-shaped. The gate electrode of the third thin film transistor 3 (that is, the third gate electrode 301), the third subsection 6011, and the fourth subsection 6012 are combined to form a second shape, and the second shape is a shape formed by flipping the first shape horizontally and vertically.

In some embodiments, a source electrode of the fifth thin film transistor 5 is called a third source electrode 500, and the third source electrode 500 is connected to the first source electrode 100. A source electrode of the sixth thin film transistor 6 is called a fourth source electrode 600, and the fourth source electrode 600 is connected to the second source electrode 200.

Wherein, the third source electrode 500 and the first source electrode 100 are in the same layer (that is, the second layer). The third source electrode 500 includes a fifth subsection 5001 and a sixth subsection 5002 vertically connected to each other, and the fifth subsection 5001 is vertically connected to a bottom of the first source electrode 100.

The fourth source electrode 600 and the second source electrode 200 are in the same layer (that is, the second layer). The fourth source electrode 600 includes a seventh subsection 6001 and an eighth subsection 6002 vertically connected to each other, and the seventh subsection 6001 is vertically connected to a top of the second source electrode 200.

It should be noted that since the seventh subsection 6001 and the third drain electrode 302 will cross with each other in the second layer, in order to prevent the two from short circuits, an adapter line is configured as the seventh subsection 6001 to connect the eighth subsection 6002 and the second source electrode 200. Wherein, the adapter line is a wire having insulated surfaces.

In some embodiments, the gate electrode of the first thin film transistor 1 (that is, the first gate electrode 101) and the gate electrode of the third thin film transistor 3 (that is, the third gate electrode 301) are connected to a first clock signal line, and the gate electrode of the second thin film transistor 2 (that is, the second gate electrode 201) and the gate electrode of the fourth thin film transistor 4 (that is, the fourth gate electrode 401) are connected to a second clock signal line. The first source electrode 100 is connected to a first data line, and the second source electrode 200 is connected to a second data line.

It should be noted that since the gate electrode of the fifth thin film transistor 5 (that is, the fifth gate electrode 501) and the second gate electrode 201 have a connection relationship, the fifth gate electrode 501 can also receive signals output from the second clock signal line. Since the gate electrode of the sixth thin film transistor 6 (that is, the sixth gate electrode 601) and the third gate electrode 301 have a connection relationship, the sixth gate electrode 601 can also receive signals output from the first clock signal line.

Since the source electrode of the fifth thin film transistor 5 (that is, the third source electrode 500) and the first source electrode 100 have a connection relationship, the third source electrode 500 can also receive data output from the first data line. Since the source electrode of the sixth thin film transistor 6 (that is, the fourth source electrode 600) and the second source electrode 200 have a connection relationship, the fourth source electrode 600 can also receive data output from the second data line.

Figure 4:
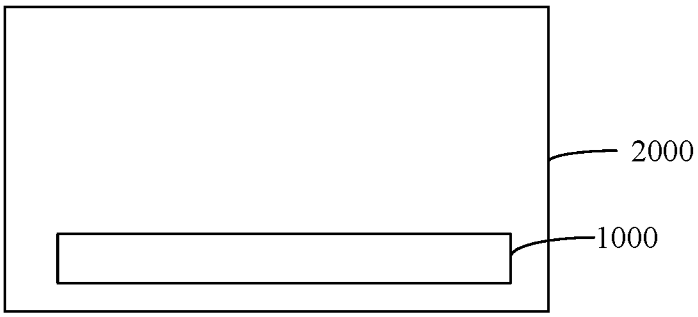
FIG. 4 is a schematic structural diagram of a display panel according to an embodiment of the present disclosure.

An embodiment of the present disclosure further provides a display panel. Referring to FIG. 4, the display panel 2000 includes the above demultiplexer 1000. It should be noted that the display panel 2000 may be an LTPS display panel.

Since the above embodiment has described the demultiplexer 1000 in detail, it will not be repeated here. It can be understood that the display panel 2000 provided in the embodiment of the present disclosure includes the demultiplexer 1000 including the plurality of demultiplexer units. By disposing two second type thin film transistors between two of the demultiplexer units adjacent to each other in the demultiplexer 1000, the space utilization of the demultiplexer 1000 can be improved and the size of the demultiplexer 1000 can be reduced, which is beneficial to realize narrow bezels of LTPS display panels.

Figure 5:
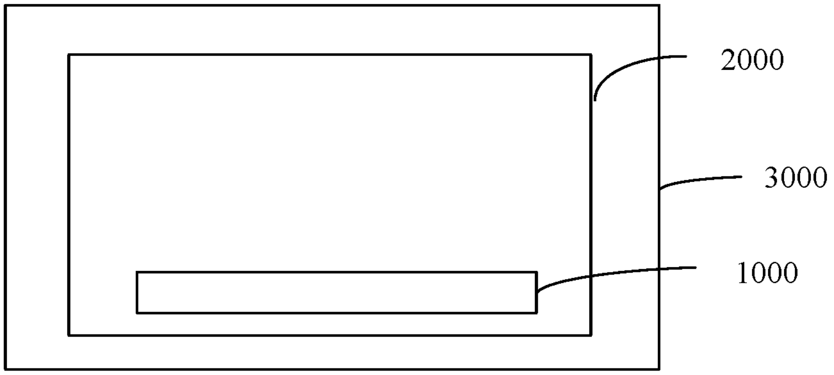
FIG. 5 is a schematic structural diagram of a display device according to an embodiment of the present disclosure.

An embodiment of the present disclosure further provides a display device. Referring to FIG. 5, the display device 3000 includes the above display panel 2000.

Since the above embodiments have described the display panel 2000 and the demultiplexer 1000 in detail, they will not be repeated here. The display device 3000 provided in the embodiment of the present disclosure includes the display panel 2000. The display panel 2000 includes the demultiplexer 1000 including the plurality of demultiplexer units. By disposing two second type thin film transistors between two of the demultiplexer units adjacent to each other, the space utilization of the demultiplexer 1000 can be improved and the size of the demultiplexer 1000 can be reduced, which is beneficial to realize narrow bezels of LTPS display panels, thereby being beneficial to realize narrow bezels of LTPS display devices.

It can be understood that for a person of ordinary skill in the art, equivalent replacements or changes can be made according to the technical solution of the present disclosure and its inventive concept, and all these changes or replacements should fall within the protection scope of the claims attached to the present disclosure.

What is claimed is:

1. A demultiplexer, comprising a plurality of demultiplexer units, wherein each of the demultiplexer units comprises two first type thin film transistors sharing a source electrode, and two second type thin film transistors are disposed between two of the demultiplexer units adjacent to each other;

wherein the two of the demultiplexer units adjacent to each other are respectively a first demultiplexer unit and a second demultiplexer unit, two first type thin film transistors in the first demultiplexer unit are respectively a first thin film transistor and a second thin film transistor, two first type thin film transistors in the second demultiplexer unit are respectively a third thin film transistor and a fourth thin film transistor, and two second type thin film transistors between the first demultiplexer unit and the second demultiplexer unit are respectively a fifth thin film transistor and a sixth thin film transistor;

the fifth thin film transistor and the second thin film transistor share a drain electrode, and the sixth thin film transistor and the third thin film transistor share another drain electrode;

a gate electrode of the fifth thin film transistor is connected to a gate electrode of the second thin film transistor, and a gate electrode of the sixth thin film transistor is connected to a gate electrode of the third thin film transistor;

the gate electrode of the fifth thin film transistor comprises a first subsection and a second subsection vertically connected to each other, and the first subsection is vertically connected to a middle part of the gate electrode of the second thin film transistor;

the gate electrode of the sixth thin film transistor comprises a third subsection and a fourth subsection vertically connected to each other, and the third subsection is vertically connected to a middle part of the gate electrode of the third thin film transistor;

the gate electrode of the second thin film transistor, the first subsection, and the second subsection are combined to form a first shape, and the first shape is h-shaped; and the gate electrode of the third thin film transistor, the third subsection, and the fourth subsection are combined to form a second shape, and the second shape is a shape formed by flipping the first shape horizontally and vertically.

2. The demultiplexer according to claim 1, wherein a source electrode shared by the first thin film transistor and the second thin film transistor is a first source electrode, and another source electrode shared by the third thin film transistor and the fourth thin film transistor is a second source electrode; and a source electrode of the fifth thin film transistor is connected to the first source electrode, and a source electrode of the sixth thin film transistor is connected to the second source electrode.

3. The demultiplexer according to claim 2, wherein the source electrode of the fifth thin film transistor comprises a fifth subsection and a sixth subsection vertically connected to each other, and the fifth subsection is vertically connected to a bottom of the first source electrode;

the source electrode of the sixth thin film transistor comprises a seventh subsection and an eighth subsection vertically connected to each other, and the seventh subsection is vertically connected to a top of the second source electrode; and wherein the seventh subsection is an adapter line.

4. The demultiplexer according to claim 2, wherein a gate electrode of the first thin film transistor, the gate electrode of the second thin film transistor, the gate electrode of the third thin film transistor, a gate electrode of the fourth thin film transistor, the gate electrode of the fifth thin film transistor, and the gate electrode of the sixth thin film transistor are disposed in a first layer;

the first source electrode, the second source electrode, the source electrode of the fifth thin film transistor, and the source electrode of the sixth thin film transistor are disposed in a second layer; and a drain electrode of the first thin film transistor, the drain electrode of the second thin film transistor, the drain electrode of the third thin film transistor, and a drain electrode of the fourth thin film transistor are disposed in the second layer.

5. The demultiplexer according to claim 2, wherein a gate electrode of the first thin film transistor and the gate electrode of the third thin film transistor are connected to a first clock signal line, the gate electrode of the second thin film transistor and a gate electrode of the fourth thin film transistor are connected to a second clock signal line, the first source electrode is connected to a first data line, and the second source electrode is connected to a second data line.

6. A display panel, comprising a demultiplexer comprising a plurality of demultiplexer units, wherein each of the demultiplexer units comprises two first type thin film transistors sharing a source electrode, and two second type thin film transistors are disposed between two of the demultiplexer units adjacent to each other;

the two of the demultiplexer units adjacent to each other are respectively a first demultiplexer unit and a second demultiplexer unit, two first type thin film transistors in the first demultiplexer unit are respectively a first thin film transistor and a second thin film transistor, two first type thin film transistors in the second demultiplexer unit are respectively a third thin film transistor and a fourth thin film transistor, and two second type thin film transistors between the first demultiplexer unit and the second demultiplexer unit are respectively a fifth thin film transistor and a sixth thin film transistor;

the fifth thin film transistor and the second thin film transistor share a drain electrode, and the sixth thin film transistor and the third thin film transistor share another drain electrode;

a gate electrode of the fifth thin film transistor is connected to a gate electrode of the second thin film transistor, and a gate electrode of the sixth thin film transistor is connected to a gate electrode of the third thin film transistor;

the gate electrode of the fifth thin film transistor comprises a first subsection and a second subsection vertically connected to each other, and the first subsection is vertically connected to a middle part of the gate electrode of the second thin film transistor;

the gate electrode of the sixth thin film transistor comprises a third subsection and a fourth subsection vertically connected to each other, and the third subsection is vertically connected to a middle part of the gate electrode of the third thin film transistor;

the gate electrode of the second thin film transistor, the first subsection, and the second subsection are combined to form a first shape, and the first shape is h-shaped; and the gate electrode of the third thin film transistor, the third subsection, and the fourth subsection are combined to form a second shape, and the second shape is a shape formed by flipping the first shape horizontally and vertically.

7. The display panel according to claim 6, wherein a source electrode shared by the first thin film transistor and the second thin film transistor is a first source electrode, and another source electrode shared by the third thin film transistor and the fourth thin film transistor is a second source electrode; and a source electrode of the fifth thin film transistor is connected to the first source electrode, and a source electrode of the sixth thin film transistor is connected to the second source electrode.

8. The display panel according to claim 7, wherein the source electrode of the fifth thin film transistor comprises a fifth subsection and a sixth subsection vertically connected to each other, and the fifth subsection is vertically connected to a bottom of the first source electrode;

the source electrode of the sixth thin film transistor comprises a seventh subsection and an eighth subsection vertically connected to each other, and the seventh subsection is vertically connected to a top of the second source electrode; and wherein the seventh subsection is an adapter line.

9. The display panel according to claim 7, wherein a gate electrode of the first thin film transistor, the gate electrode of the second thin film transistor, the gate electrode of the third thin film transistor, a gate electrode of the fourth thin film transistor, the gate electrode of the fifth thin film transistor, and the gate electrode of the sixth thin film transistor are disposed in a first layer;

the first source electrode, the second source electrode, the source electrode of the fifth thin film transistor, and the source electrode of the sixth thin film transistor are disposed in a second layer; and a drain electrode of the first thin film transistor, the drain electrode of the second thin film transistor, the drain electrode of the third thin film transistor, and a drain electrode of the fourth thin film transistor are disposed in the second layer.

10. The display panel according to claim 7, wherein a gate electrode of the first thin film transistor and the gate electrode of the third thin film transistor are connected to a first clock signal line, the gate electrode of the second thin film transistor and a gate electrode of the fourth thin film transistor are connected to a second clock signal line, the first source electrode is connected to a first data line, and the second source electrode is connected to a second data line.

11. The display panel according to claim 6, being a low temperature polysilicon display panel.

12. A display device comprising a display panel, wherein the display panel comprises a demultiplexer comprising a plurality of demultiplexer units, each of the demultiplexer units comprises two first type thin film transistors sharing a source electrode, and two second type thin film transistors are disposed between two of the demultiplexer units adjacent to each other;

the two of the demultiplexer units adjacent to each other are respectively a first demultiplexer unit and a second demultiplexer unit, two first type thin film transistors in the first demultiplexer unit are respectively a first thin film transistor and a second thin film transistor, two first type thin film transistors in the second demultiplexer unit are respectively a third thin film transistor and a fourth thin film transistor, and two second type thin film transistors between the first demultiplexer unit and the second demultiplexer unit are respectively a fifth thin film transistor and a sixth thin film transistor;

the fifth thin film transistor and the second thin film transistor share a drain electrode, and the sixth thin film transistor and the third thin film transistor share another drain electrode;

a gate electrode of the fifth thin film transistor is connected to a gate electrode of the second thin film transistor, and a gate electrode of the sixth thin film transistor is connected to a gate electrode of the third thin film transistor;

the gate electrode of the fifth thin film transistor comprises a first subsection and a second subsection vertically connected to each other, and the first subsection is vertically connected to a middle part of the gate electrode of the second thin film transistor;

the gate electrode of the sixth thin film transistor comprises a third subsection and a fourth subsection vertically connected to each other, and the third subsection is vertically connected to a middle part of the gate electrode of the third thin film transistor;

the gate electrode of the second thin film transistor, the first subsection, and the second subsection are combined to form a first shape, and the first shape is h-shaped; and the gate electrode of the third thin film transistor, the third subsection, and the fourth subsection are combined to form a second shape, and the second shape is a shape formed by flipping the first shape horizontally and vertically.

* * * * *